(12) United States Patent
Song

(10) Patent No.: US 9,093,885 B2
(45) Date of Patent: Jul. 28, 2015

(54) METHODS AND SYSTEMS FOR CLEANING RELAY CONTACTS

(75) Inventor: Wei Song, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 229 days.

(21) Appl. No.: 13/295,718

(22) Filed: Nov. 14, 2011

(65) Prior Publication Data
US 2013/0119798 A1    May 16, 2013

(51) Int. Cl.
*H01H 9/30* (2006.01)
*H02K 11/00* (2006.01)

(52) U.S. Cl.
CPC .................................. *H02K 11/0094* (2013.01)

(58) Field of Classification Search
CPC ...................................................... H01H 1/605
USPC .......... 335/78, 201; 361/6; 307/137; 318/727
See application file for complete search history.

(56) References Cited

U.S. PATENT DOCUMENTS

| | | | |
|---|---|---|---|
| 3,560,796 A * | 2/1971 | Landis | 361/6 |
| 4,069,801 A * | 1/1978 | Stevens | 123/598 |
| 4,500,934 A * | 2/1985 | Kinsinger | 361/3 |
| 5,041,775 A | 8/1991 | Erdman | |
| 5,179,290 A * | 1/1993 | Page | 307/137 |
| 5,502,609 A * | 3/1996 | Thomas et al. | 361/6 |
| 6,002,559 A * | 12/1999 | Meyer | 361/6 |
| 7,385,791 B2 * | 6/2008 | Ness | 361/8 |
| 7,573,360 B2 * | 8/2009 | Bryan et al. | 335/201 |

OTHER PUBLICATIONS

Jack Ganssle, Solving Switch bounce problems, Apr. 21, 2004. Pages 1-4.*
Tyco Electronics Corporation—P&B, Relay Contact Life Application Note, Winston-Salem, NC 3 pages.

* cited by examiner

*Primary Examiner* — Rina Duda
*Assistant Examiner* — Bickey Dhakal
(74) *Attorney, Agent, or Firm* — Armstrong Teasdale LLP

(57) ABSTRACT

An electric motor that includes a contact arc inducing apparatus is described. The electric motor includes an input terminal configured for coupling with a relay that includes contacts that are electrically coupled when closed and separated by an air gap when open. The input terminal configured to receive power from the relay when the contacts are closed, wherein a predefined arc voltage and arc current facilitate an electric discharge across the contacts when the contacts are transitioned from closed to open. The contact arc inducing apparatus is coupled to the input terminal and configured to provide to the input terminal a current greater than the arc current of the relay and a voltage greater than the arc voltage of the relay during a contact bounce.

20 Claims, 6 Drawing Sheets

METHODS AND SYSTEMS FOR CLEANING RELAY CONTACTS

BACKGROUND OF THE INVENTION

The embodiments described herein relate generally to power relays, and more specifically, to systems and methods for cleaning relay contacts.

An electric discharge, referred to herein as contact arcing, occurs between contacts within a mechanical power relay when a voltage and a current present at the contacts are above predefined levels and the contacts are switched between a closed position and an open position. Contact arcing occurs because the current in the circuit cannot instantaneously jump to zero when the relay is opened, and as a result, a transient arc forms across the separating contacts. An arc voltage is defined as a voltage that exists across contacts separated by a small gap that will cause an electric discharge across the gap. An arc current is defined as a current necessary to sustain an arc caused by the arc-voltage electric discharge. The arc voltage and arc current are known values associated with a specific relay and are dependent on the materials included in the relay contacts.

In traditional appliances that include induction motors, motor windings are switched through power relays to change the motor speed. Currents through these relays typically are higher than one amp. This level of electric current is above the predefined arc current for the relays and causes contact arcing when the relay is switched between closed and open positions.

Arcing can be beneficial as it removes sulfidation, oxidation, and/or contaminates from surfaces of the relay contacts. In relay applications where the voltage and/or current present at the contacts is less than the arc voltage and/or arc current, since contact arcing will not occur, a film of sulfidation, oxidation, and/or contaminates may form on the surfaces of the relay contacts to a level that negatively affects circuit continuity. Furthermore, the relay may malfunction due to corrosion over time.

BRIEF DESCRIPTION OF THE INVENTION

In one aspect, an electric motor that includes a contact arc inducing apparatus is provided. The electric motor includes an input terminal configured for coupling with a relay that includes contacts that are electrically coupled when closed and separated by an air gap when open, the input terminal configured to receive power from the relay when the contacts are closed, wherein a predefined arc voltage and arc current facilitate an electric discharge across the contacts when the contacts are transitioned from closed to open. The contact arc inducing apparatus is coupled to the input terminal and configured to provide a current greater than the arc current of the relay to the input terminal during a contact bounce after the contacts are transitioned from open to closed.

In another aspect, a method for inducing contact arcing in a relay that includes contacts that are electrically coupled when closed and are separated by an air gap when open is provided. A predefined arc voltage and arc current facilitate an electric discharge across the contacts when the contacts are transitioned from closed to open. The method includes coupling a resistor-capacitor (RC) circuit to a contact of the relay, the RC circuit comprising at least one resistive device and at least one capacitor. The method also includes configuring the RC circuit to store energy when the contacts are closed and to provide current to the relay during a contact bounce.

DETAILED DESCRIPTION OF THE INVENTION

The methods and systems described herein facilitate cleaning relay contacts using arcing when the current delivered by the relay to a load is less than a defined arcing current. The methods and systems described herein induce arcing across relay contacts in applications where contact arcing would not occur otherwise.

Technical effects of the methods and systems described herein include at least one of: (a) coupling a resistor-capacitor (RC) circuit to a contact of the relay, the RC circuit comprising at least one resistive device and at least one capacitor; (b) configuring the RC circuit to store energy when the relay is closed; and (c) configuring the RC circuit to provide current to the relay during a contact bounce after the relay is closed.

Figure 1:
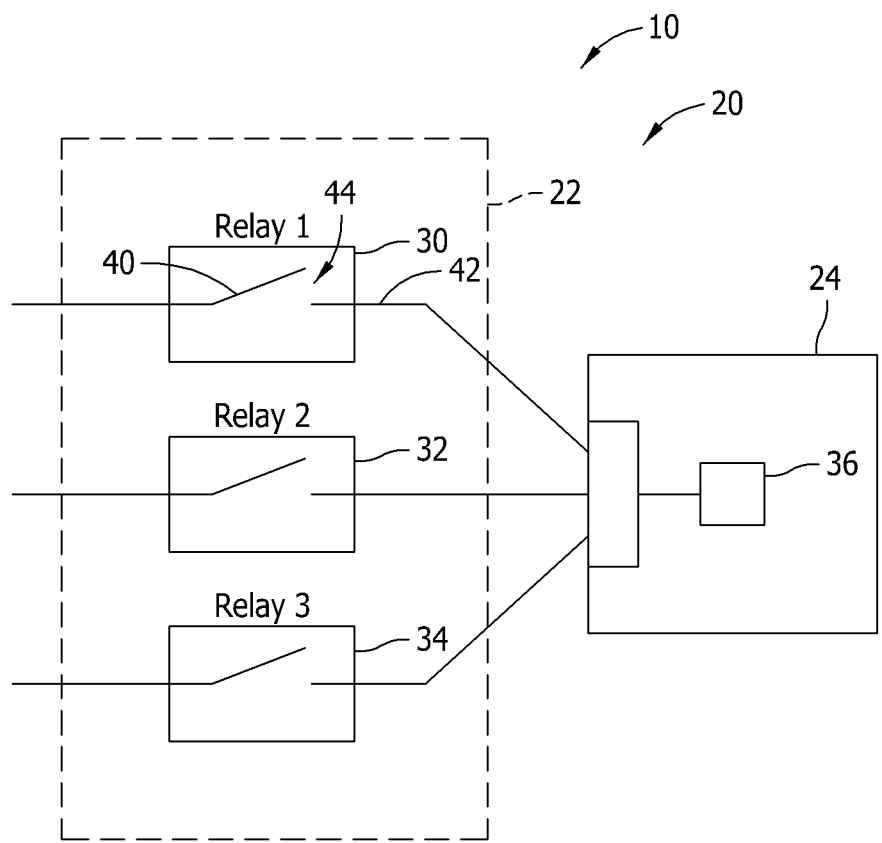
FIG. 1 is a block diagram of a known motor control system.

FIG. 1 is a block diagram 10 of a known motor control system 20. In the exemplary embodiment, motor control system 20 includes a system controller 22 electrically coupled to an electric motor 24. System controller 22 includes a plurality of relays, for example, a first relay 30, a second relay 32, and a third relay 34. Electric motor 24 includes, in one embodiment, a variable speed induction motor having multiple field windings 36. The speed of motor 24 is dependent upon which of field windings 36 are provided with power. For example, system controller 22 may control the speed of motor 24 by controlling which of relays 30, 32, and 34 provide power to electric motor 24.

Relays 30, 32, and 34 include relay contacts. For example, relay 30 includes a first contact 40 and a second contact 42. When relay 30 is open, first contact 40 and second contact 42 are separated by an air gap 44, and therefore, no current flows through relay 30. When relay 30 is closed, first contact 40 and second contact 42 are not separated by air gap 44 (i.e., contact is made between first contact 40 and second contact 42), and current is able to flow through relay 30. During use, sulfidation, oxidation, and/or contaminants may form on first contact 40 and/or second contact 42, which may reduce circuit continuity, and therefore, prevent proper operation of relay 30. However, a level of current delivered to electric motor 24 through relay 30 is high enough that arcing occurs during switching of relay 30. Arcing cleans contacts 40 and 42, which maintains circuit continuity at a suitable level for proper operation of relay 30.

An arc voltage is defined herein as a voltage that exists on contacts separated by an air gap that will cause an electric discharge across the gap. An arc current is defined as a current necessary to sustain an arc caused by the arc-voltage electric discharge. The arc voltage and arc current are known values associated with a specific relay and are dependent on the materials included in the relay contacts. For example, relay 30 may be selected to have an arc current within a range from 0.1 amps to 2 amps, or more specifically, from 0.3 amps to 1 amp, or even more specifically, of approximately 0.5 amps. Furthermore, relay 30 may be selected to have an arc voltage within a range from 5 volts to 25 volts, or more specifically, from 10 volts to 20 volts, or even more specifically, of approximately 15 volts. If the current through relay 30 is higher than the arc current, and a voltage across contacts 40 and 42 is higher than the arc voltage when contacts 40 and 42 are opened, cleaning of contacts 40 and 42 caused by arcing will occur when relay 30 is opened.

Figure 2:
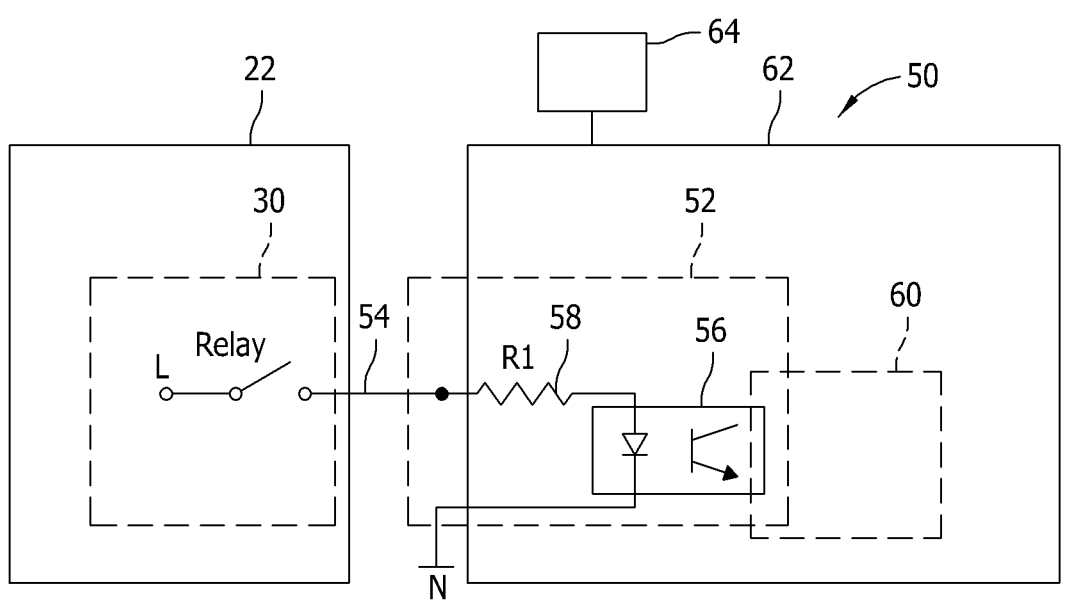
FIG. 2 is a circuit diagram of a known input interface that may be included in the motor control system shown in FIG. 1.

FIG. 2 is a circuit diagram 50 of a known interface circuit 52 that may be included in motor control system 20 (shown in FIG. 1). Motor input interface circuit 52 includes an input terminal 54, an isolation device 56, and a resistive device 58 coupled between input terminal 54 and isolation device 56. Isolation device 56 may include, but is not limited to including, an opto-coupler. Resistive device 58 may include a resistor and is configured to reduce the level of current received at the opto-coupler to less than the input current rating of the opto-coupler. Isolation device 56 and resistive device 58 are typically coupled to, or included within, a motor controller 60 that controls operation of a variable speed electric motor 62. A speed of variable speed electric motor 62 is not varied through switching windings, as described above with respect to induction motor 24, but rather, is controlled based on signals received from system controller 22.

More specifically, electric motor 62 may include any electric motor that includes, or is coupled to, a motor controller for controlling operation of the motor. For example, electric motor 62 may include, but is not limited to, a brushless direct current (BLDC) motor, a brushless alternating current (BLAC) motor, and/or a reluctance motor. Electric motor 62 may be referred to as an electronically commutated motor (ECM). Power received by electric motor 62 from system controller 22 is not used as an operating power (i.e., is not applied to windings within electric motor 62) by electric motor 62. Rather, electric motor 62 receives operating power from a power source 64, and uses power received from system controller 22 as a speed selection signal. For example, if relay 30 is closed, and power is received at isolation device 56, electric motor 62 is configured to operate at a first speed. The first speed is related to a speed at which induction motor 24 would operate if power were received at first field windings coupled to relay 30. Similarly, if relay 32 (shown in FIG. 1) is closed, and power is received at an isolation device (not shown in FIG. 2) coupled to relay 32, electric motor 62 is configured to operate at a second speed. The second speed is related to a speed at which induction motor 24 would operate if power were received at second field windings coupled to relay 32.

Typically, an input current of isolation device 56 is less than, for example, 0.1 amps, and more specifically, less than 0.05 amps. As described above, isolation device 56 is not configured for providing operating power to electric motor 62, but rather, provides a speed selection signal to motor controller 60. However, current at this level does not cause arcing within relay 30. Therefore, if induction motor 24 is replaced with a variable speed electric motor, for example, electric motor 62, conductivity of contacts 40 and/or 42 may be compromised due to the lack of arcing.

Figure 3:
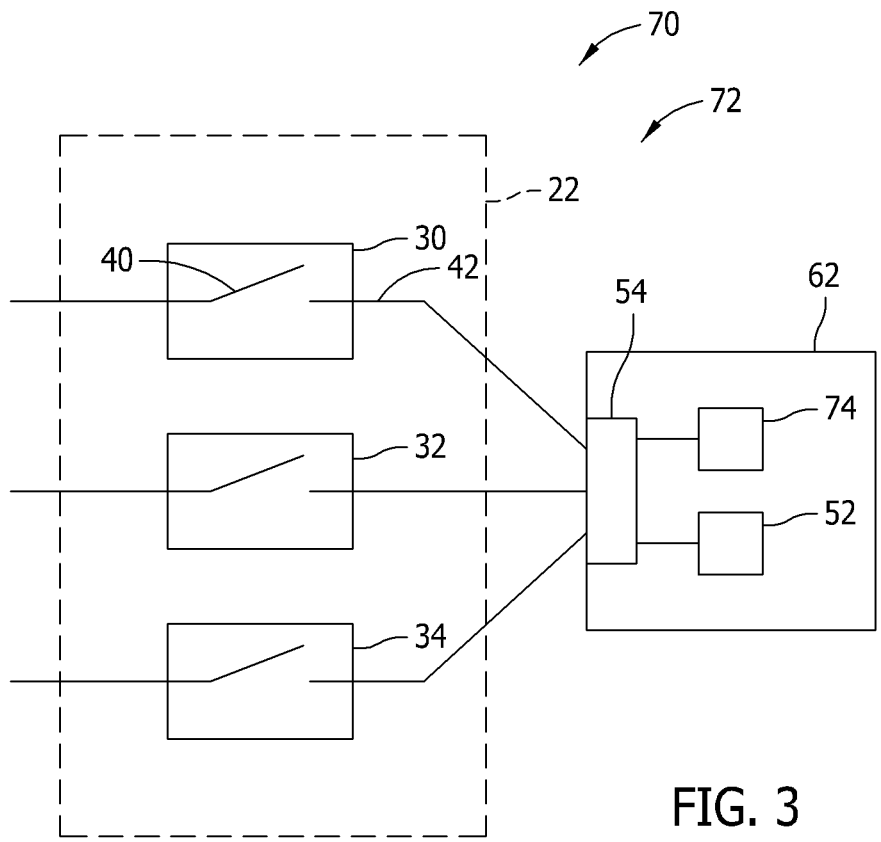
FIG. 3 is a block diagram of an exemplary motor control system that includes a contact arc inducing apparatus.

FIG. 3 is a block diagram 70 of an exemplary motor control system 72 that includes a contact arc inducing apparatus 74.

In the exemplary embodiment, motor control system 72 includes system controller 22 and electric motor 62. In the exemplary embodiment, electric motor 62 includes motor input interface circuit 52 and contact arc inducing apparatus 74. In an alternative embodiment, motor input interface circuit 52 and/or contact arc inducing apparatus 74 are coupled to electric motor 62.

Figure 4:
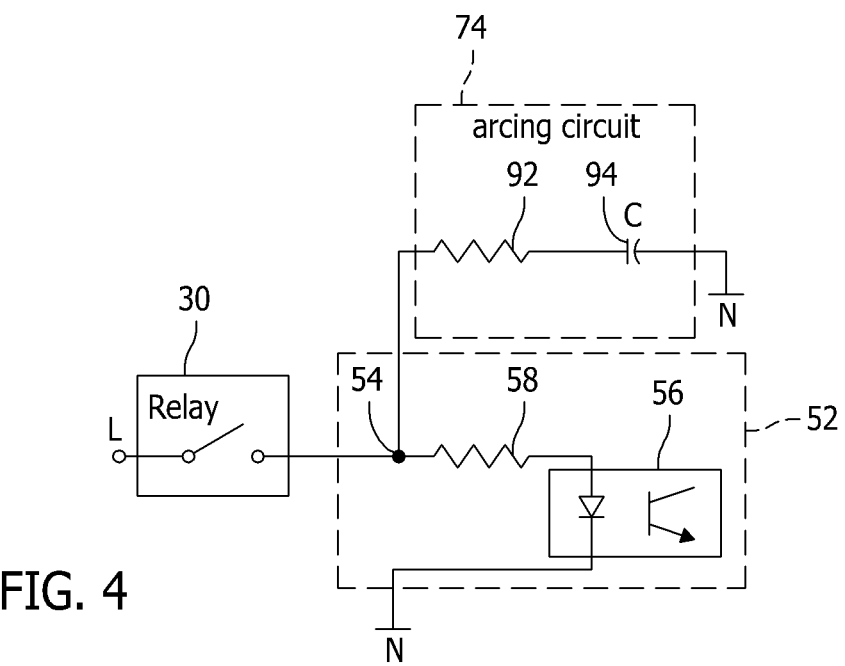
FIG. 4 is a circuit diagram of an input interface and contact arc inducing apparatus that may be included in the motor control system shown in FIG. 3.

FIG. 4 is an exemplary circuit diagram of interface circuit 52 and contact arc inducing apparatus 74 (both shown in FIG. 3). As described above, motor input interface circuit 52 includes an input terminal 54, an isolation device 56, and a resistive device 58 coupled between input terminal 54 and isolation device 56. As described above with respect to FIG. 2, a system controller, for example, system controller 22 (shown in FIG. 1), that was designed for use with an induction motor, for example, motor 24 (shown in FIG. 1), may be coupled to, and used to control operation of, a variable speed motor, for example, variable speed motor 62 (shown in FIG. 2). In the exemplary embodiment, input terminal 54 is configured to be removably coupled to system controller 22, and more specifically, to relays 30, 32, and/or 34.

In the exemplary embodiment, contact arc inducing apparatus 74 is a resistor-capacitor (RC) circuit that includes at least one resistive device 92 and at least one capacitor 94. Contact arc inducing apparatus 74 is coupled to input terminal 54 and is configured to store energy and provide a current to input terminal 54. Furthermore, contact arc inducing apparatus 74 is connected in parallel with interface circuit 52. In the exemplary embodiment, contact arc inducing apparatus 74 provides a current higher than an arc current of relay 30 to relay 30 at a time when the voltage across relay contacts 40 and 42 when open is greater than an arc voltage of relay 30. More specifically, contact arc inducing apparatus 74 stores energy when power is received at input terminal 54 and provides current to input terminal 54 during an initial bounce of relay 30.

As described above, relay 30 may have been selected for use with induction motor 24 (shown in FIG. 1) and may have an arc current of approximately 0.5 amps and an arc voltage of approximately 15 volts. However, motor interface circuit 52 draws less current than the arc current, for example, approximately 0.05 amps. If relay 30 is providing a current less than the arc current, arcing will not occur and the cleaning of contacts 40 and 42 that arcing provides will not take place.

Figure 5:
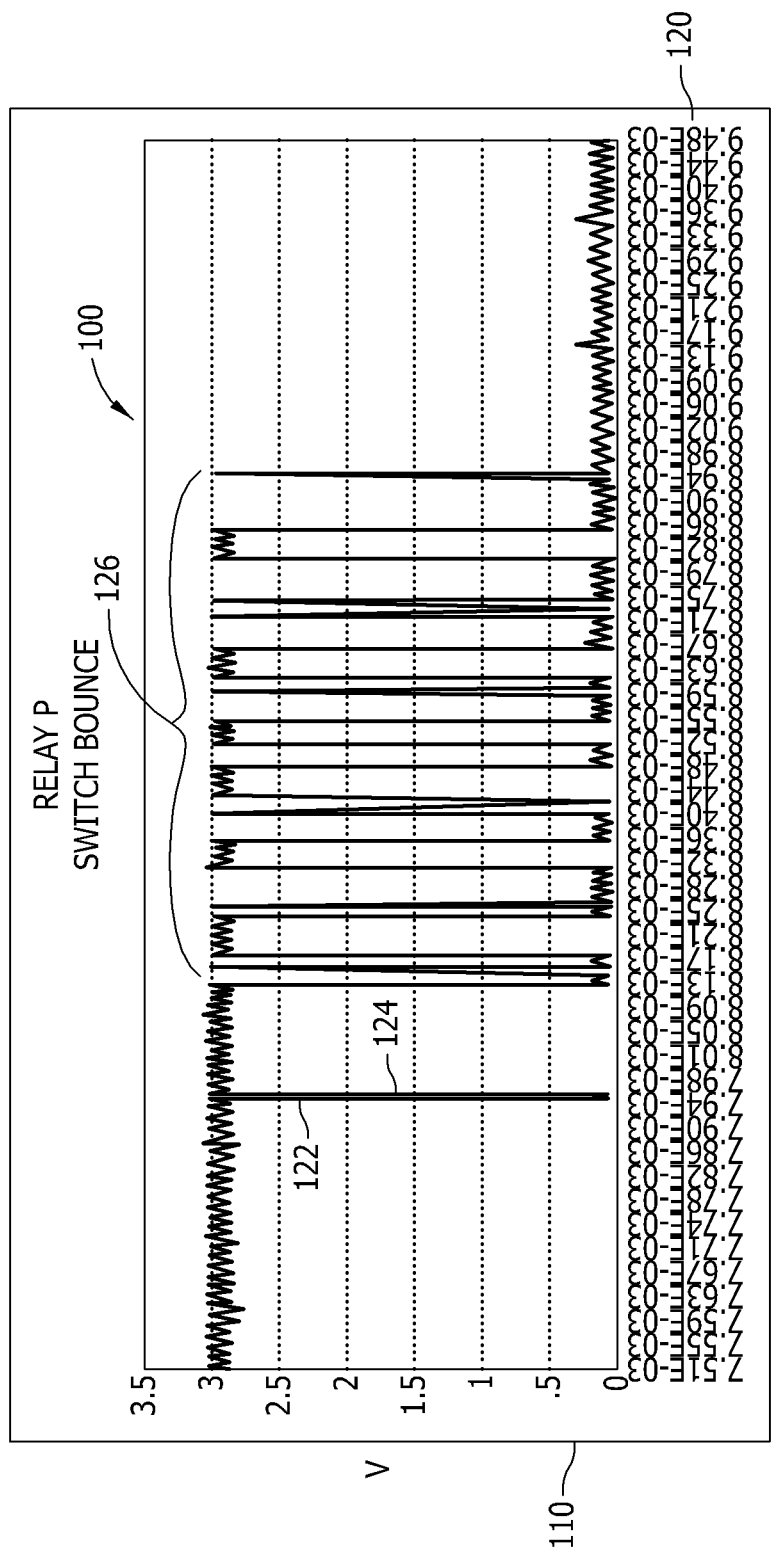
FIG. 5 is a chart of an exemplary voltage response over time during switching of a relay.

FIG. 5 is a chart 100 of an exemplary voltage response 110 over time 120 during switching of a relay, for example, relay 30 (shown in FIG. 4). When relay is switched from open to closed, the voltage across contacts 40 and 42 does not instantly change from a starting voltage (V1) to zero volts. Rather, the voltage across contacts 40 and 42 oscillates between approximately V1 and zero volts before settling at approximately zero volts (i.e., relay 30 is closed). Each oscillation is referred to herein as a "contact bounce." A first downward pulse 122 represents initial contact between contacts 40 and 42 when relay 30 is switched from open to closed. The initial contact is followed by a first contact bounce 124 and a plurality of subsequent bounces 126. Bounce characteristics of a specific relay, for example, relay 30, may be determined. Bounce characteristics may include, but are not limited to, an average time to initial bounce. The average time to initial bounce is defined herein as a time between initial contact of contacts 40 and 42 and first contact bounce 124. For example, in the exemplary embodiment, the average time to initial bounce is between approximately 10 microseconds and 20 microseconds, and more specifically, between approximately 12 microseconds and 16 microseconds.

In the exemplary embodiment, an RC time constant of the RC circuit within arc inducing apparatus 74 is determined based at least partially on bounce characteristics of relay 30. In the exemplary embodiment, when relay 30 is closed, current is provided to capacitor 94, through relay 30, which charges capacitor 94. As current charges capacitor 94, the amplitude of the current in arc inducing apparatus 74 decreases and a capacitor voltage increases. As described above, a current condition and a voltage condition must be achieved in order for an arc to be generated across contacts 40 and 42. More specifically, an arc can be generated across contacts 40 and 42 if current through relay 30 is higher than the arc current and a voltage across contacts 40 and 42 is higher than the arc voltage when contacts 40 and 42 are opened.

If capacitor 94 is charged completely prior to first contact bounce 124, the current in arc inducing apparatus 74 decreases to zero. If the current in arc inducing apparatus 74 is zero, arc inducing apparatus 74 is not able to generate a contact arc in relay 30. Furthermore, if capacitor 94 is charged completely prior to first contact bounce 124, the voltage across contacts 40 and 42 when opened will be zero, and arc inducing apparatus 74 is not able to generate a contact arc in relay 30.

To prevent the current within arc inducing apparatus 74 from decreasing to zero and the voltage across contacts 40 and 42 when opened from decreasing to zero, a time constant of the RC circuit within arc inducing apparatus 74 is determined that will prevent capacitor 94 from being fully charged prior to first contact bounce 124. More specifically, the time constant is determined such that conditions that cause arcing (i.e., suitable arc voltage and arc current) are present at the time of first contact bounce 124. In other words, the RC time constant of the RC circuit within arc inducing apparatus 74 is greater than the average initial bounce time of relay 30.

Contact arc inducing apparatus 74 uses a contact bounce, which is a natural action within a typical mechanical switch such as relay 30, to generate a contact arc within relay 30. After relay 30 is switched from open to closed, capacitor 94 is charged enough to store sufficient energy to generate an arc across contacts 40 and 42. The charging of capacitor 94 is controlled such that capacitor 94 is not fully charged before at least first contact bounce 124.

Figure 6:
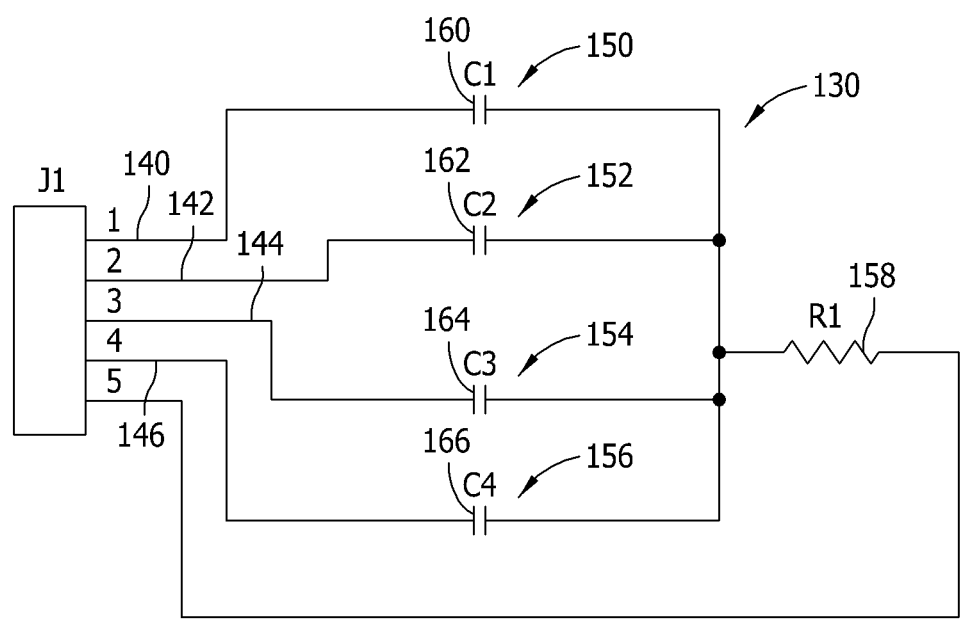
FIG. 6 is a circuit diagram of an exemplary contact arc inducing apparatus configured to provide arcing conditions to multiple system controller relays.

FIG. 6 is a circuit diagram of an exemplary contact arc inducing apparatus 130 configured to provide arcing conditions to multiple system controller relays. In the exemplary embodiment, arc inducing apparatus 130 is electrically coupled to a plurality of input terminals, for example, a first input terminal 140, a second input terminal 142, a third input terminal 144, and a fourth input terminal 146. The plurality of input terminals are configured for coupling with a plurality of relays (not shown in FIG. 6). In the exemplary embodiment, arc inducing apparatus 130 includes a first RC circuit 150, a second RC circuit 152, a third RC circuit 154, and a fourth RC circuit 156. RC circuits 150, 152, 154, and 156 store energy and provide suitable current/voltage to relays coupled to input terminals 140, 142, 144, and 146 in the manner described above with respect to contact arc inducing apparatus 74 (shown in FIG. 3).

More specifically, in the exemplary embodiment, arc inducing apparatus 130 includes a first capacitor 160, a second capacitor 162, a third capacitor 164, a fourth capacitor 166, and a resistive device 158. Time constants of RC circuits 150, 152, 154, and 156 are determined as described above with respect to contact arc inducing apparatus 74. Although illustrated as a single resistive device 158, contact arc inducing apparatus 130 may include multiple resistive devices, for example, one resistive device corresponding to each of capacitors 160, 162, 164, and 166. However, by including common resistive device 158, a part count of arc inducing apparatus 130 is reduced, and circuit board space may be saved.

Figure 7:
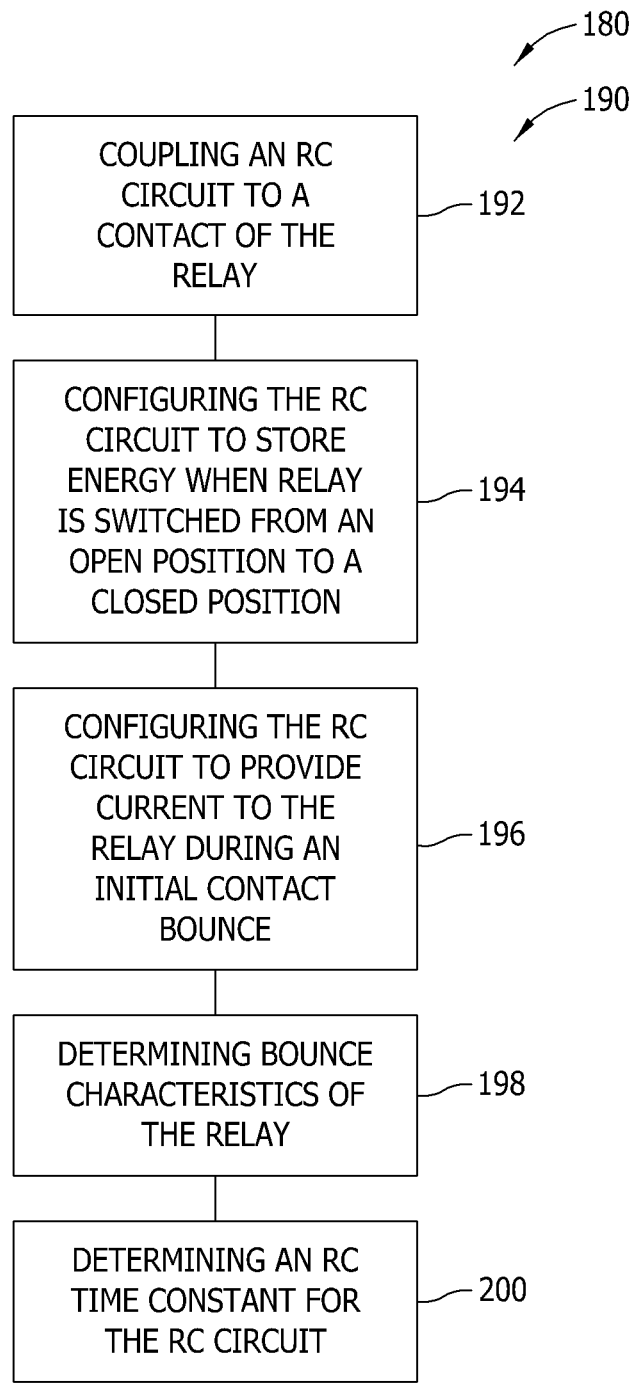
FIG. 7 is a flow chart of an exemplary method for inducing contact arcing in a relay.

FIG. 7 is a flow chart 180 of an exemplary method 190 for inducing contact arcing in a relay, for example, relay 30 (shown in FIG. 3). In the exemplary embodiment, method 190 includes coupling 192 a resistor-capacitor (RC) circuit to a contact of the relay, the RC circuit comprising at least one resistor and at least one capacitor. For example, RC circuit 74 may be coupled 192 to contact 42 of relay 30 (all shown in FIG. 4). As described above, RC circuit 74 includes resistive device 92 and capacitor 94.

In the exemplary embodiment, method 190 also includes configuring 194 RC circuit 74 to store energy when relay 30 is switched from an open position to a closed position. Furthermore, method 190 also includes configuring 196 RC circuit 74 to provide current to relay 30 during an initial contact bounce after relay 30 is closed. For example, configuring 194 RC circuit 74 to store energy may include determining 198 bounce characteristics of relay 30. The bounce characteristics may include, but are not limited to, an average initial bounce time, which is defined herein as a length of time between initial closing of relay 30 and the initial contact bounce.

Moreover, configuring 196 RC circuit 74 to provide current to relay 30 during the initial relay bounce includes determining 200 an RC time constant for RC circuit 74 that prevents capacitor 94 from being fully charged prior to at least the initial contact bounce. More specifically, a time constant for RC circuit 74 is determined 200 such that RC circuit 74 provides a current greater than an arc current of relay 30 at a time when the voltage across the relay contacts when open is greater than an arc voltage of relay 30.

Described herein are exemplary methods and systems for cleaning relay contacts using arcing when the current delivered by the relay to an application is less than a defined arc current. More specifically, the methods and systems described herein use a contact bounce, which is a natural action within a typical mechanical switch such as a relay, to generate a contact arc within the relay. After the relay is switched from open to closed, a capacitor is charged enough to store sufficient energy to generate an arc across contacts within the relay. The charging of the capacitor is controlled to prevent the capacitor from fully charging before at least the first contact bounce. This creates the conditions necessary within the relay to generate a contact arc as the contacts open due to the first contact bounce and potentially other contact bounces.

The methods and systems described herein facilitate efficient and economical cleaning of relay contacts. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric motor comprising:
    an input terminal configured for coupling with a relay that includes contacts that are electrically coupled when closed and separated by an air gap when open, the input terminal configured to receive power from the relay when the contacts are closed, wherein a predefined arc voltage and arc current facilitate an electric discharge across the contacts when the contacts are transitioned from closed to open; and
    a contact arc inducing apparatus coupled to the input terminal and configured to provide to the input terminal a current greater than the arc current of the relay and a voltage greater than the arc voltage of the relay when the contacts transition from closed to open during a first contact bounce between the contacts when the relay is switched from open to closed.

2. An electric motor in accordance with claim 1, wherein the input terminal is configured to receive power from a relay having an arc current higher than approximately 0.3 amps at a corresponding input voltage.

3. An electric motor in accordance with claim 1, further comprising an input interface coupled to the input terminal and comprising a first resistive device having a first end and a second end and at least one isolation device coupled to the first resistive device first end.

4. An electric motor in accordance with claim 3, wherein the at least one isolation device comprises an opto-coupler having an input current rating less than approximately 0.1 amps.

5. An electric motor in accordance with claim 4, wherein the first resistive device has a resistance configured to reduce the current received at the input terminal to less than the input current rating of the opto-coupler.

6. An electric motor in accordance with claim 3, wherein the contact arc inducing apparatus comprises a resistor-capacitor (RC) circuit connected in parallel with the input interface.

7. An electric motor in accordance with claim 6, wherein the RC circuit is electrically coupled to the second end of the first resistive device.

8. An electric motor in accordance with claim 6, wherein the RC circuit comprises at least one capacitor, wherein the capacitor is configured to:
    store energy when power is received at the input terminal; and
    provide current to the input terminal upon occurrence of the first contact bounce within the relay.

9. An electric motor in accordance with claim 8, wherein the RC circuit is configured to provide a current higher than the predefined arc current to the input terminal at a time when a voltage across the relay contacts when open is greater than the predefined arc voltage of the relay.

10. An electric motor in accordance with claim 6, wherein an RC time constant of the RC circuit is based at least partially on bounce characteristics of the relay.

11. An electric motor in accordance with claim 10, wherein bounce characteristics of the relay include an average initial bounce time, wherein the average initial bounce time is a length of time between initial closing of the relay contacts and the first contact bounce.

12. An electric motor in accordance with claim 11, wherein the RC time constant of the RC circuit is greater than the average initial bounce time.

13. A method for inducing contact arcing in a relay said method comprising:
    providing a relay that includes contacts that are electrically coupled when closed and are separated by an air gap when open, wherein a predefined arc voltage and arc current facilitate an electric discharge across the contacts when the contacts are transitioned from closed to open;
    coupling a resistor-capacitor (RC) circuit to a contact of the relay, the RC circuit comprising at least one resistive device and at least one capacitor;
    configuring the RC circuit to store energy when the contacts are closed; and
    configuring the RC circuit such that the capacitor provides a current greater than the arc current and a voltage greater than the arc voltage to the relay contacts when the contacts transition from closed to open during a first contact bounce between the contacts when the relay is switched from open to closed.

14. A method in accordance with claim 13, wherein coupling the RC circuit to a contact of the relay comprises coupling the RC circuit in parallel with an electric motor input interface.

15. A method in accordance with claim 13, wherein configuring the RC circuit to provide current to the relay comprises configuring the RC circuit to provide a current greater than the arc current of the relay at a time when the voltage across the relay contacts when open due to the first contact bounce is greater than the arc voltage of the relay.

16. A method in accordance with claim 13, wherein configuring the RC circuit to provide current to the relay during a first contact bounce comprises configuring the RC circuit to provide a higher current than a current provided to the electric motor from the relay.

17. A method in accordance with claim 13, wherein configuring the RC circuit to store energy comprises determining an RC time constant for the RC circuit that prevents the at least one capacitor from being fully charged prior to the first contact bounce.

18. A method in accordance with claim 17, further comprising determining bounce characteristics of the relay.

19. A method in accordance with claim 18, wherein determining bounce characteristics of the relay comprises determining an average initial bounce time, wherein the average initial bounce time is a length of time between initial closing of the relay contact and the first contact bounce.

20. A method in accordance with claim 18, wherein configuring the RC circuit to store energy comprises determining an RC time constant for the RC circuit based at least partially on the bounce characteristics of the relay.

* * * * *